3,407,350
UNIDIRECTIONAL FREQUENCY MULTIPLIER COMPRISING NON-LINEAR REACTANCE AND RESISTANCE
Toyosaku Isobe and Tatsuo Miyakawa, Kawasaki-shi, Japan, assignors to Fujitsu Limited, Kawasaki, Japan, a corporation of Japan
Filed Dec. 15, 1964, Ser. No. 418,569
Claims priority, application Japan, Dec. 16, 1963, 38/67,959
10 Claims. (Cl. 321—69)

ABSTRACT OF THE DISCLOSURE

A unidirectional frequency multiplier comprises a nonlinear reactance and a nonlinear resistance connected to the reactance in parallel or in series between a pair of input terminals and a pair of output terminals. A delay line is connected in series with either the reactance or the resistance and has an equivalent electrical length dependent upon the degree of multiplication.

---

This invention relates to unidirectional frequency multipliers, which have nonlinear capacitance (NC) and nonlinear resistance (NR) elements connected, either in series or in parallel, with a delay line to achieve the suitable time phase pumping, and to perform advisable nonreciprocal and high efficient conversion in case of even multiplications.

In recent years, the application of voltage variable capacitor to frequency multipliers has received considerable attention.

Most of this interest stems from the possibility of obtaining conversion efficiencies which are far better than those obtainable by other techniques. Frequency multiplier stages can usually be placed in tandem to achieve any desired microwave frequencies. However, since varactor (variable capacitance diode) is basically nonlinear reactance, it contains many ingredients necessary for parametric amplifiers and oscillators. Circuit design for frequency multiplier is somewhat critical, that is, unless the most careful choice of the circuit is made, it might have condition such as parametrically excited oscillation instability.

This problem will give further complicated instability when many stages are connected in tandem.

To eliminate the occurrence of oscillation, it is important to isolate adequately the circuit in reverse direction.

In "Proceedings of the IRE," vol. 50, pp. 312–321, Engelbrecht has analyzed the perfect isolation case of frequency converter where two frequencies ($f_1$, $f_2$) are coupled by NC, NR combination which is pumped in time quadrature at a frequency $f_0(=f_1 \pm f_2)$ and the small signal relation is held between the quantities of $f_1$, $f_2$.

In the frequency multiplier, however, since the signal frequency is the pumping frequency itself, no small signal treatments can unconditionally be applied on it, and then, the time phase relation that pumps NC, NR elements to obtain the unidirectional characteristics, should be determined to satisfy the input and output frequency terminal conditions.

This invention offers frequency multipliers which possess various necessary properties not present in conventional multiplier circuits as that of pure NC or pure NR.

An object of this invention is to obtain frequency multipliers, which satisfies unidirectional property.

An object of this invention is to obtain stable frequency multipliers without such fault as parametrically excited oscillation instability.

An object of this invention is to obtain frequency multipliers which have high conversion efficiency.

Another object of this invention is to realize frequency multipliers which normally act with even relatively large input signal.

These objects are achieved by constructing frequency multipliers with nonlinear capacitance (NC) and nonlinear resistance (NR) and moreover by achieving the suitable time phase between the terminal voltages of said NC and NR.

As the concrete methods to achieve the suitable time phase described above, it is for instance given to equivalently in electrical sense insert delay line with suitable length into one branch, for example, into the input side of NR circuit.

Especially when the charge controlled NC and NR elements are connected in series, the doubler, sextupler and so on have no use for the delay line.

Utilizing the idler circuit as the delay line equivalently, quadrupler, for example, has been realized to possess nonreciprocal property and its excellent characteristics have been proven, experimentally.

GENERAL PROCEDURE (a) Frequency multiplication by nonlinear capacitance

In case of essential nonlinear capacitance, the current $i$ and the voltage $v$ are related by $$i = C(v)\frac{dv}{dt} \qquad (1)$$

The voltage on the capacitance can be represented as $$v = v_1 + v_2$$

where $v_1$ is the fundamental frequency voltage and $v_2$ is the harmonic frequency, and if $v_1 > v_2$ $$C(v_1 + v_2) = c(v_1) + \frac{dc}{dv}(v_1) \cdot v_2 \left[1 + \frac{dv_2/dt}{dv_1/dt}\right] + \cdots \qquad (2)$$

where $$\frac{dc}{dv}(v_1) = \frac{dc}{dt}(v_1) \Big/ \frac{dv}{dt}(v_1)$$

Carrying out the operations indicated in Equation 1 and if we neglect the term $$\frac{dv_2}{dt} \Big/ \frac{dv_1}{dt}$$

comparing to unity, we get the expression for the current.

$$i = C(v_1)\left[\frac{dv_1}{dt} + \frac{dv_2}{dt}\right] + \frac{dc}{dt}(v_1) \cdot v_2 \cdots \qquad (3)$$

where we let $$v_1 = V_1 e^{j\omega t} + V_1^* e^{-j\omega t}$$

$$v_2 = \sum_{n=-\infty}^{\infty} V_n e^{jn\omega t}$$

$$C(v_1) = C_0 \sum_{n=-\infty}^{\infty} \gamma_n e^{jn\omega t} \quad \gamma_n = \gamma_{-n} \qquad (4)$$

$$i = \sum_{n=-\infty}^{\infty} I_n \cdot e^{jn\omega t}$$

*Denotes the complex conjugate.

By substituting the values in Eq. 4 into Eq. 3, we obtain the $n$th harmonic current (4), viz.

$$I_n = j\omega c_0 [\gamma_{n-1} - \gamma_{n+1}] V_1 + j\omega n c_0 \sum_{k=1}^{\infty} [\gamma_{n-k} + \gamma_{n+k} e^{-j2\phi_k}] V_k \cdots \qquad (5)$$

The summation in Eq. 5 extends over the voltages which are allowed to be present by the external circuit to the varactor. The fundamental and the $n$th harmonic currents are represented as follows if the only $V_1$, $V_n$ are allowed to exist in the circuit.

$$\begin{bmatrix} I_1 \\ I_n \end{bmatrix} = \begin{bmatrix} Y_{11} & Y_{12} \\ Y_{21} & Y_{22} \end{bmatrix} \begin{bmatrix} V_1 \\ V_2 \end{bmatrix} = \begin{bmatrix} j\omega C_0(\gamma_0 - \gamma_2) + G_0(\sigma_0 - \sigma_2) & j\omega C_0(\gamma_{n-1} - \gamma_{n+1}) + G_0(\sigma_{n-1} - \sigma_{n+1}) \\ j\omega C_0(\gamma_{n-1} - \gamma_{n+1}) + \frac{G_0}{n}(\sigma_{n-1} - \sigma_{n+1}) & jn\omega C_0(\gamma_0 - \gamma_{2n}) + G_0(\sigma_0 - \sigma_{2n}) \end{bmatrix} \begin{bmatrix} V_1 \\ V_n \end{bmatrix}$$
(13)

$$I_1 = j\omega C_0[\gamma_0 - \gamma_2]V_1 + j\omega C_0[\gamma_{n-1} + \gamma_{n+1}e^{-j2\phi_n}]V_n$$
$$I_n = j\omega C_0[\gamma_{n-1} - \gamma_{n+1}]V_1 + jn\omega C_0[\gamma_0 + \gamma_{2n}e^{-j2\phi_n}]V_n \quad (6)$$

where phase angle $\phi_n$ can be chosen as $\pi/2$ to obtain the maximum conversion efficiency. Thus the currents and voltages at frequency $f_1$ and $f_n$ are related by the following admittance matrix.

$$\begin{bmatrix} I_1 \\ I_n \end{bmatrix} = j\omega C_0 \begin{bmatrix} \gamma_0 - \gamma_1 & \gamma_{n-1} - \gamma_{n+1} \\ \gamma_{n-1} - \gamma_{n+1} & n(\gamma_0 - \gamma_{2n}) \end{bmatrix} \begin{bmatrix} V_1 \\ V_n \end{bmatrix} \quad (7)$$

(b) Frequency multiplication by non-linear resistance

In case of essential nonlinear resistance, the current $i$ and the voltage $V$ are related by $$\frac{di}{dt} = \frac{di}{dv} \cdot \frac{dv}{dt} = G(v) \frac{dv}{dt} \quad (8)$$

Here, in the large signal case the equation $$\frac{di}{dt} = \frac{di}{dv} \cdot \frac{dv}{dt}$$

should be used instead of $$\delta_i = \frac{di}{dv} \delta v$$

which is usually applied to mixer and other small signal calculation.

By the same manner as (a), Eq. 8 is transformed to Eq. 9

$$\frac{di}{dt} \simeq G(v_1) \left[ \frac{dv_1}{dt} + \frac{dv_2}{dt} \right] + \frac{dG}{dt}(v_1)v_2 \ldots \quad (9)$$

where wet let $$G(v_1) = G_0 \sum_{n=-\infty}^{\infty} \sigma_n e^{jn\omega t} \quad (10)$$

substituting $v_1$, $v_2$ and $i$ represented in Eq. 4 and the conductance in Eq. 10 in Eq. 9 we obtain $$I_n = \frac{1}{n} G_0[\sigma_{n-1} - \sigma_{n+1}]V_1 + G_0 \sum_{k=2}^{\infty} [\sigma_{n-k} + \sigma_{n+k}e^{-j2\psi_k}]V_k \quad (11)$$

The voltages which are allowed to be present are $V_1$ and $V_n$ and phase angle $\psi_k$ is chosen as $\pi/2$ to conform the circuit connection described in the following chapter.

Then in matrix notation, we have $$\begin{bmatrix} I_1 \\ I_n \end{bmatrix} = G_0 \begin{bmatrix} \sigma_0 - \sigma_2 & \sigma_{n-1} - \sigma_{n+1} \\ \frac{1}{n}(\sigma_{n-1} - \sigma_{n+1}) & \sigma_0 - \sigma_{2n} \end{bmatrix} \begin{bmatrix} V_1 \\ V_2 \end{bmatrix} \quad (12)$$

Figure 1:
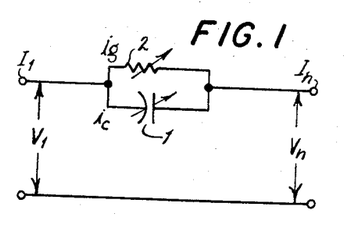
Figure 2:
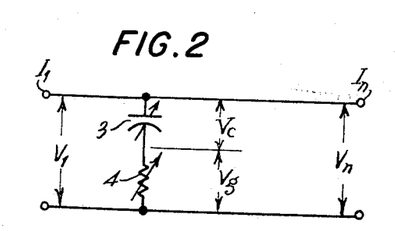

(c) The combination of NC and NR elements (i) *Parallel NC–NR connection.*—In FIG. 1 the essential parallel non-linear capacitance 1 and non-linear resistance 2 connection is shown, where the admittance matrix of the transducer is given by (ii) *Series NC–NR connection.*—In FIG. 2 the essential series non-linear capacitance 3 and non-linear resistance 4 connection is shown.

In this case the current and the voltage are related by $$i = \int G \cdot dv_g = C \frac{dv_c}{dt} \quad (14)$$

where $V_g$ and $V_c$ are denoted by the voltages across the NR and NC element, respectively.

Solving for the V's from Eq. 14, we obtain $$\begin{bmatrix} V_1 \\ V_n \end{bmatrix} = \begin{bmatrix} Z_{11} & Z_{12} \\ Z_{21} & Z_{22} \end{bmatrix} \begin{bmatrix} I_1 \\ I_n \end{bmatrix} \quad (15)$$

where $$Z_{11} = \left[ \frac{jn\omega C_0(\gamma_0 - \gamma_{2n})}{\omega^2 C_0^2(\gamma_{n-1} - \gamma_{n+1})^2 - n\omega^2 C_0^2(\gamma_0 - \gamma_{2n})(\gamma_0 - \gamma_2)} + \frac{G_0(\sigma_0 - \sigma_{2n})}{G_0^2(\sigma_0 - \sigma_{2n})(\sigma_0 - \sigma_2) - \frac{G_0^2}{n}(\sigma_{n-1} + \sigma_{n+1})^2} \right]$$

$$Z_{12} = \left[ \frac{-G_0(\sigma_{n-1} - \sigma_{n+1})}{G_0^2(\sigma_0 - \sigma_{2n})(\sigma_0 - \sigma_2) - \frac{G_0^2}{n}(\sigma_{n-1} - \sigma_{n+1})^2} - \frac{j\omega C_0(\gamma_{n-1} - \gamma_{n+1})}{\omega^2 C_0^2(\gamma_{n-1} - \gamma_{n+1})^2 - n\omega^2 C_0^2(\gamma_0 - \gamma_{2n})(\gamma_0 - \gamma_2)} \right]$$

$$Z_{21} = \left[ \frac{-j\omega C_0(\gamma_{n-1} - \gamma_{n+1})}{\omega^2 C_0^2(\gamma_{n-1} - \gamma_{n+1})^2 - n\omega^2 C_0^2(\gamma_0 - \gamma_{2n})(\gamma_0 - \gamma_2)} - \frac{\frac{G_0}{n}(\sigma_{n-1} - \sigma_{n+1})}{G_0^2(\sigma_0 - \sigma_{2n})(\sigma_0 - \sigma_2) - \frac{G_0^2}{n}(\sigma_{n-1} - \sigma_{n+1})^2} \right]$$

$$Z_{22} = \left[ \frac{j\omega C_0(\gamma_0 - \gamma_2)}{\omega^2 C_0^2(\gamma_{n-1} - \gamma_{n+1})^2 - n\omega^2 C_0^2(\gamma_0 - \gamma_{2n})(\gamma_0 - \gamma_2)} + \frac{G_0(\sigma_0 - \sigma_2)}{G_0^2(\sigma_0 - \sigma_{2n})(\sigma_0 - \sigma_2) - \frac{G_0^2}{n}(\sigma_{n-1} - \sigma_{n+1})^2} \right] \quad (16)$$

Unidirectional condition

We define actual exciting voltages on the NC and NR that are constructed to obtain the unidirectional property as $V_c$, $V_G$ respectively. They have specific relations in phase and amplitude to the original voltage $V_1$.

In the following paragraph, to avoid the complexity of calculation, consideration is limited to obtain general aspect of the phase relation for the unidirectional condition.

The computation for the circuit construction including more voltage amplitude variation may be calculated precisely in more detail using the beforementioned phase relation as reference.

(a) Parallel connection

Figure 3:
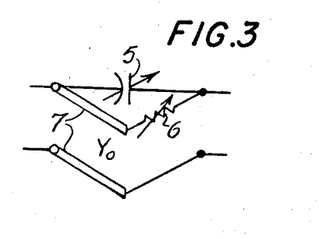

FIG. 3 theoretically shows a practical circuit of this invention. In FIG. 3 the parallel non-linear capacitance 5 and non-linear resistance 6 circuit is in the series branch of a frequency multiplier. A delay line 7 is connected in the input side of NR branch.

Figure 4:
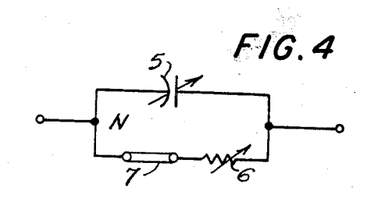

FIG. 4 shows equivalent circuit of said practical circuit shown in FIG. 3.

For the parallel NC–NR circuit, Eq. (13) shows that transmission from $f_n$ to $f_1$ is zero when $Y_{12=0}$, we thus have $$G_0 \sigma_{n-1} = -j\omega C_0 \gamma_{n-1} \left(1 - \frac{\gamma_{n+1}}{\gamma_{n-1}}\right) \bigg/ \left(1 - \frac{\sigma_{n+1}}{\sigma_{n-1}}\right) \quad (17)$$

If the terms in parentheses in Eq. (17) are positive real numbers, $G_0 \sigma_{n-1}$ must have sign of "$-1$". Therefore is is necessary to insert the delay line $N\pi/2$ whose characteristic admittance $Y_0$ is to match the operating conductance of N.R. into the NR branch as indicated in FIG. 3, to satisfy the requirement.

Hence conductance G and capacitance C are expanded as the following time functions $$C = C_0 \sum_{n=-\infty}^{\infty} \gamma_n e^{in\omega t}$$
$$= C_0[\gamma_0 + 2\gamma_1 \cos \omega t + 2\gamma_2 \cos 2\omega t + \cdots] \quad (18)$$

$$G = G_0 \sum_{n=-\infty}^{\infty} \sigma_n e^{jn\left(\omega t - N\frac{\pi}{2}\right)}$$
$$= G_0\left[\sigma_0' + 2\sigma_1' \cos\left(\omega t - N\frac{\pi}{2}\right) + \cdots\right] \quad (19)$$

then, the following condition is required for the isolation in the reverse direction.

$$\cos(n-1)\left(\omega t - N\frac{\pi}{2}\right) = \sin(n-1)\omega t \quad (20)$$

Therefore $$(1-n)N\frac{\pi}{2} = (4a+3)\frac{\pi}{2} \quad (21)$$

where the $a$ is an integer.

From Eq. (21) we can get the relation between $n$ and $N$ as will be shown later.

(b) Series connection

Figure 5:
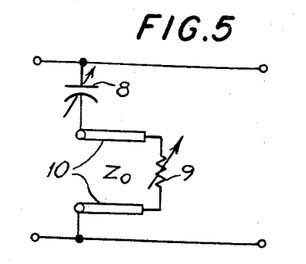

FIG. 5 theoretically shows the other practical circuit of this invention. In FIG. 5 the series non-linear capacitance 8 and non-linear resistance 9 circuit is in the parallel branch of a frequency multiplier. A delay line 10 is equivalently inserted between the non-linear capacitance 8 and the non-linear resistance 9 elements. The equivalent circuit of said practical circuit shown in FIG. 5 is shown in FIG. 6.

In this case, it must be noted that the time phase of $V_g$ (terminal voltage of NR) is originally advanced by $\pi/2$ than that of $Vc$ (terminal voltage of NC).

Figure 6:
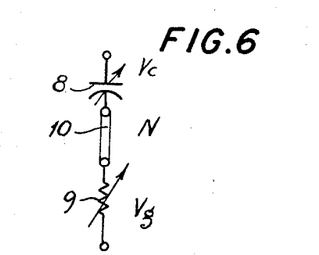

Therefore, if we insert the $N\pi/2$ length delay line whose characteristic impedance is to match the operating resistance of NR, between NC and NR, as shown in FIG. 6, the conductance G is expanded in time function as follows.

$$G = G_0 \sum_{n=-\infty}^{\infty} \sigma_0'' e^{jn\left[\omega t + (1-N)\frac{\pi}{2}\right]}$$
$$= G_0\left[\sigma_0'' + 2\sigma_1'' \cos\left(\omega t + (1-N)\frac{\pi}{2}\right)\right.$$
$$\left. + 2\sigma_2'' \cos(2\omega t + (1-N)\pi) + \cdots\right] \quad (22)$$

Eq. (16) shows that transmission from $f_n$ to $f_1$ is zero when $Z_{12} = O$, we thus have $$G_0\sigma_{n-1} = \frac{jG_0^2\sigma_0^2 \frac{\gamma_{n-1}}{\gamma_0}\left(1 - \frac{\gamma_{n+1}}{\gamma_{n-1}}\right)\left[\left(1-\frac{\sigma_2}{\sigma_0}\right)\left(1-\frac{\sigma_{2n}}{\sigma_2}\right) - \frac{1}{n}\left(\frac{\sigma_{n-1}}{\sigma_0}\right)^2\left(1-\frac{\sigma_{n+1}}{\sigma_{n-1}}\right)^2\right]}{\omega C_0 \gamma_0\left(1-\frac{\sigma_{n+1}}{\sigma_{n-1}}\right)\left[n\left(1-\frac{\gamma_2}{\gamma_0}\right)\left(1-\frac{\gamma_{2n}}{\gamma_0}\right) - \left(\frac{\gamma_{n+1}}{\gamma_0}\right)^2\left(1-\frac{\gamma_{n+1}}{\gamma_{n-1}}\right)^2\right]} \quad (23)$$

If the terms in the parentheses in Eq. (23) are positive real numbers, $G_0\sigma_{n-1}$ must have sign of "$j$" and next relation must be satisfied.

$$\cos(n-1)\left(\omega t + (1-N)\frac{\pi}{2}\right) = -\sin(n-1)\omega t \quad (24)$$

therefore $$(n-1)(1-N)\frac{\pi}{2} = (4a+1)\frac{\pi}{2} \quad (25)$$

Various N values for $n$ which can be obtained from Eq. (21) and (25) are shown in Table 1. Namely, delay line lengths required for unidirectional condition at $n$th harmonic multipliers are shown in Table 1.

TABLE 1

| $n$ | Parallel Connection $N(\pi/2)$ | Series Connection $N(\pi/2)$ |
|---|---|---|
| 2 | 1 | 0 |
| 3 | $\frac{1}{2}$ | $\frac{1}{2}$ |
| 4 | $\frac{1}{3}, 3$ | $\frac{2}{3}, 2$ |
| 5 | $\frac{1}{4}$ | $\frac{3}{4}$ |
| 6 | 1 | 0 |

As shown in Table 1, especially when NC and NR elements are connected in series, the doubler and sextupler have no use for the delay line. In Table 1 only calculations of N in the cases of $n=2, 3, 4, 5$ and 6 are shown, but the cases of $N(\pi/2) = O$ will occur except the cases of calculations shown in Table 1.

*Optimum conversion efficiency with perfect isolation and stability*

Figure 7:
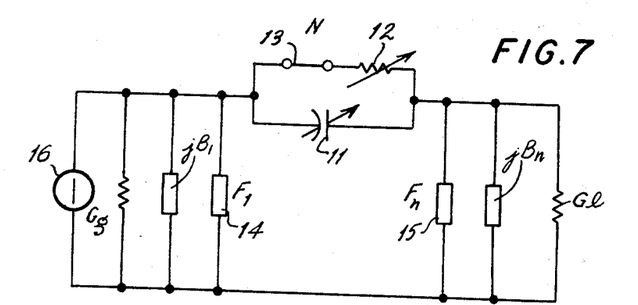

(a) Conversion efficiency (i) *Parallel connection.*—In FIG. 7 the essential circuit is shown for the analysis of a parallel non-linear capacitance 11 and non-linear resistance 12 pair.

Ideal filters $F_1$ or 14 and $F_n$ or 15 are provided, as shown in FIG. 7, to prevent voltages at frequencies other than $f_1$ and $f_n$ from developing across the nonlinear elements. In FIG. 7 a delay line 13 or $N\pi/2$ and a source 16 of fundamental frequency are provided.

External loads of admittances $Y_1 = G_g + jB_1$ and $Y_2 = G_1 + jB_n$ are connected to the terminal pairs. When the symbols of input and output admittances in the above mentioned are chosen, the conversion efficiency $G_t$ defined the ratio of the power dissipated in $G_1$ to the maximum available power from $G_g$ is as follows:

$$G_t = \frac{4G_g G_1 |Y_{21}|^2}{|(Y_{11}+Y_1)(Y_{22}+Y_2) - Y_{12}Y_{21}|^2} \quad (26)$$

Selecting $G_g:G_1$ to obtain the optimum conversion efficiency, viz, $$\frac{\partial G_t}{\partial G_g} = 0, \quad \frac{\partial G_t}{\partial G_1} = 0$$

This yields the next conditions $$G_g = Y_{11} + jB_1, \quad G_1 = Y_{22} + jB_2 \quad (27)$$

By substituting the value in Eq. (27) and the relation $Y_{12} = O$, into Eq. (26), we can obtain the optimum conversion efficiency $G_{t\,opt}$ when the transducer is adjusted to zero reverse transmission.

$$\vec{G}_{t\,opt} = \frac{|Y_{21}|^2}{4|Y_{11}+jB)(Y_{22}+jB_n)} \quad (28)$$

Rewriting by the admittance values and unidirectional condition given in Eq. (27), provides an optimum conversion efficiency of $$\vec{G}_{topt} = \frac{\left|\left(1\frac{\sigma_{n+1}}{\sigma_{n-1}}\right)\left(1-\frac{1}{n}\right)^2\right|}{4\left|\left(\frac{\sigma_0}{\sigma_{n-1}}\right)^2\left(1-\frac{\sigma_2}{\sigma_0}\right)\left(1-\frac{\sigma_{2n}}{\sigma_0}\right)\right|}$$

Rearrangement of Equation (17) provides the equivalent Q value of the combination of NC and NR elements when it is adjusted to zero reverse transmission, that is, $$j\frac{\omega C_0\gamma_0}{G_0\sigma_0} = -\frac{\frac{\sigma_{n-1}}{\sigma_0}\left(1-\frac{\sigma_{n+1}}{\sigma_{n-1}}\right)}{\frac{\gamma_{n-1}}{\gamma_0}\left(1-\frac{\gamma_{n+1}}{\gamma_{n-1}}\right)} \equiv jQ_e \quad (30)$$

Figure 8:
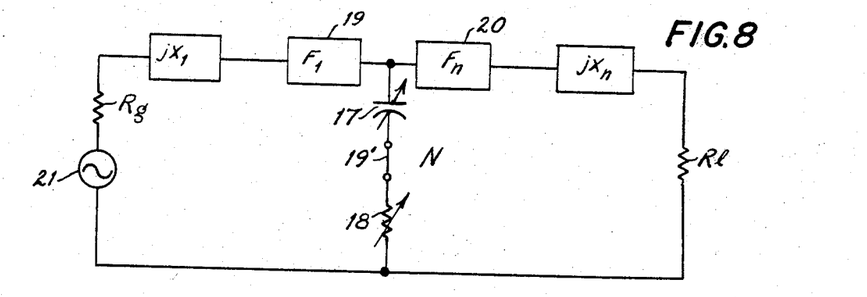

(ii) *Series connection.*—The essential circuit for analyzing the series non-linear capacitance 17 and non-linear resistance 18 combination is shown in FIG. 8. The filters $F_1$ or 19 and $F_n$ or 20 are assumed to present a short circuit at the frequencies $f_1$ and $f_n$ respectively, and to an open circuit at all other frequencies. External impendance $Z_1=R_g+jX_1$, and $Z_2=R_1+jX_n$, are connected as shown in FIG. 8. In FIG. 8, a delay line 19' or $N\pi/2$ and a source 21 of fundamental frequency are provided. Similarly, from Eq. 16 the unidirectional condition is $$j\frac{G_0\sigma_0}{\omega C_0\gamma_0} = \frac{\frac{\sigma_{n-1}}{\sigma_0}\left(1-\frac{\sigma_{n+1}}{\sigma_{n-1}}\right)\left[n\left(1-\frac{\gamma_2}{\gamma_0}\right)\left(1-\frac{\gamma_{2n}}{\gamma_0}\right)-\left(\frac{\gamma_{n-1}}{\gamma_0}\right)^2\left(1-\frac{\gamma_{n+1}}{\gamma_{n-1}}\right)^2\right]}{\frac{\gamma_{n-1}}{\gamma_0}\left(1-\frac{\gamma_{n+1}}{\gamma_{n-1}}\right)\left[\left(1-\frac{\sigma_2}{\sigma_0}\right)\left(1-\frac{\sigma_{2n}}{\sigma_0}\right)-\frac{1}{n}\left(\frac{\sigma_{n-1}}{\sigma_0}\right)^2\left(1-\frac{\sigma_{n+1}}{\sigma_{n-1}}\right)^2\right]} = jQ_e \quad (31)$$

The conjugate matches must exist for the optimum conversion efficiency. Therefore, $$R_g = Z_{11}+jX_1, \quad R_1 = Z_{22}+jX_n \quad (32)$$

Using the above conditions and unidirectional condition $Z_{12}=O$, optimum conversion efficiency $G_{topt}$ is given the same form as in Equation 29.

$$\vec{G}_{topt} = \frac{\left|\left(1-\frac{\sigma_{n+1}}{\sigma_{n-1}}\right)\left(1-\frac{1}{n}\right)\right|^2}{4\left|\left(\frac{\sigma_0}{\sigma_{n-0}}\right)^2\left(1-\frac{\sigma_2}{\sigma_0}\right)\left(1-\frac{\sigma_{2n}}{\sigma_0}\right)\right|}$$

Figure 9:
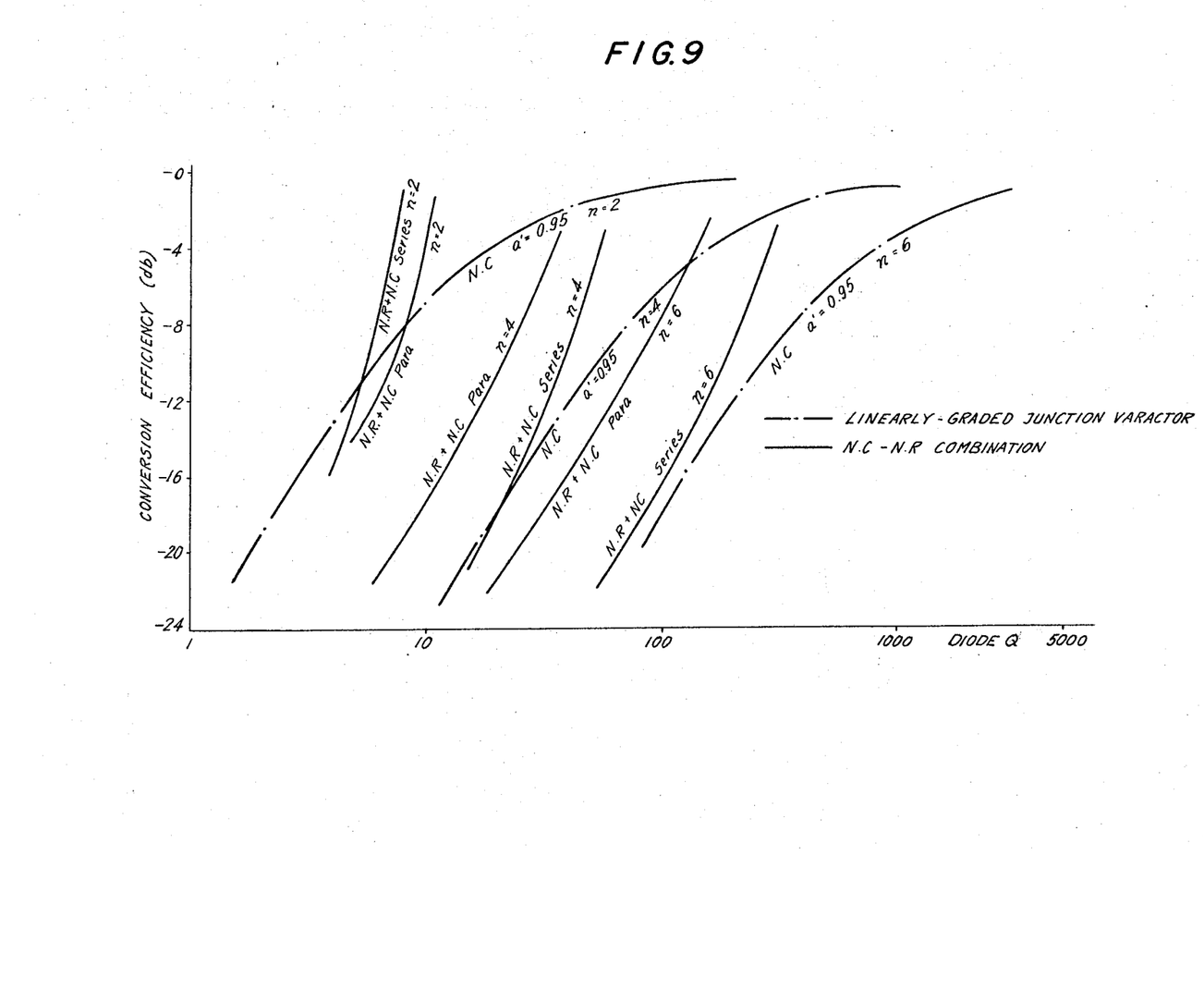

The optimum conversion efficiency obtained by Eq. 29 about the combination of N.C. (graded junction) and N.R. (typical exponential $i$–$v$ characteristics) is plotted in FIG. 9 as a function of Q value. For comparison, the common graded junction varactor, which usually assumes the combination of nonlinear capacitance and constant resistance, is plotted on the same figure in case of doubler, quadrupler and sextupler. The parameter $a'$ is the ratio of A-C voltage amplitude to D-C bias that includes contact potential.

Conversion efficiency of the NC–NR combination circuit is much larger than that of common varactor circuit which has the same Q value determined by unidirectional condition in Equation 17 or Equation 23 and, in doubler case, the conversion efficiency of series connection is higher than that of parallel connection. But in high harmonic case the parallel connection is better than series connection.

At suitable Q values, it seems that the conversion efficiency reaches 100%, but in reality, since conversion efficiency plays dominantly by the term $$\left(1-\frac{\sigma_{2n}}{\sigma_0}\right)$$

it is very difficult to obtain large $\sigma_{2n}/\sigma_0$ value near unity, for usual nonlinear elements coexisting with the parasitic resistive quantites such as spreading resistance $R_s$.

(b) Stability

As the stability measure, we consider the sensitivity which is defined as the fractional change in conversion efficiency divided by the fractional change in the load conductance $G_1$.

We thus define the next quantity $$S \equiv \frac{dG_t/G_t}{dG_1/G_1} \quad (33)$$

For comparison, the S obtained from Equation 26 in case of common varactor circuit is given as follows.

$$S = 1 - \frac{2}{1+\sqrt{\alpha+1}}$$

where $$\alpha = \frac{Y_{12}Y_{21}}{G_gG_1} = \frac{-\omega^2C_0^2\gamma_0^2(\gamma_{n-1}/\gamma_0)^2\left(1-\frac{\gamma_{n+1}}{\gamma_{n-1}}\right)}{G_g \cdot G_1} \quad (34)$$

On the other hand, in case of unidirectional frequency multipliers $$Y_{12}=O \quad \alpha=O$$

therefore $$S=O \quad (35)$$

The general symbols used in the stability measure in the parallel NC–NR connection can be equally applied to the series case if the admittances are replaced by the corresponding impedances, respectively.

From the above results we can see the unidirectional frequency multiplier is the most stable one to a load impedance fluctuation.

Variable constants NC and NR (a) *The calculation of $\gamma_n$.*—As for the Fourier expansion coefficients for the NC we calculate as follows: Let us write the variable capacitor in the form $$C = \frac{k}{m\sqrt{\phi-V}}$$

where $$V = V_{co}+V_{c1}\cos\omega t$$

if we let $$\frac{V_{c1}}{\phi-V_{co}} = \frac{V_{c1}}{V_{c0}} = a'$$

$$C = \frac{k}{m\sqrt{V_0}}\frac{1}{m\sqrt{1-a'\cos\omega t}}$$

$$= C_0[\gamma_0+2\gamma_1\cos\omega t+\cdots]$$

where $$2C_0\gamma_n = C(V_0)\left|\frac{1}{\pi}\int_{-\pi}^{\pi}\frac{\cos nx}{m\sqrt{1-a'\cos x}}dx\right.$$

$$C(V_0) = \frac{k}{m\sqrt{V_0}}$$

(b) *The calculation of $\sigma_n$.*—In the case of a nonlinear conductance whose characteristic has the typical exponential form found approximately in almost all crystal rectifiers, viz, $$G = \alpha i_0 e^{\alpha V_G} \quad (36)$$

where $\alpha=q/KT$; $q$, electron charge; K, Boltzmann's const.; $i_0$ is reverse saturation current; $V_G$ is the voltage across the barrier.

Figures 10, 12A, 12B, 13A, 13B, 16:
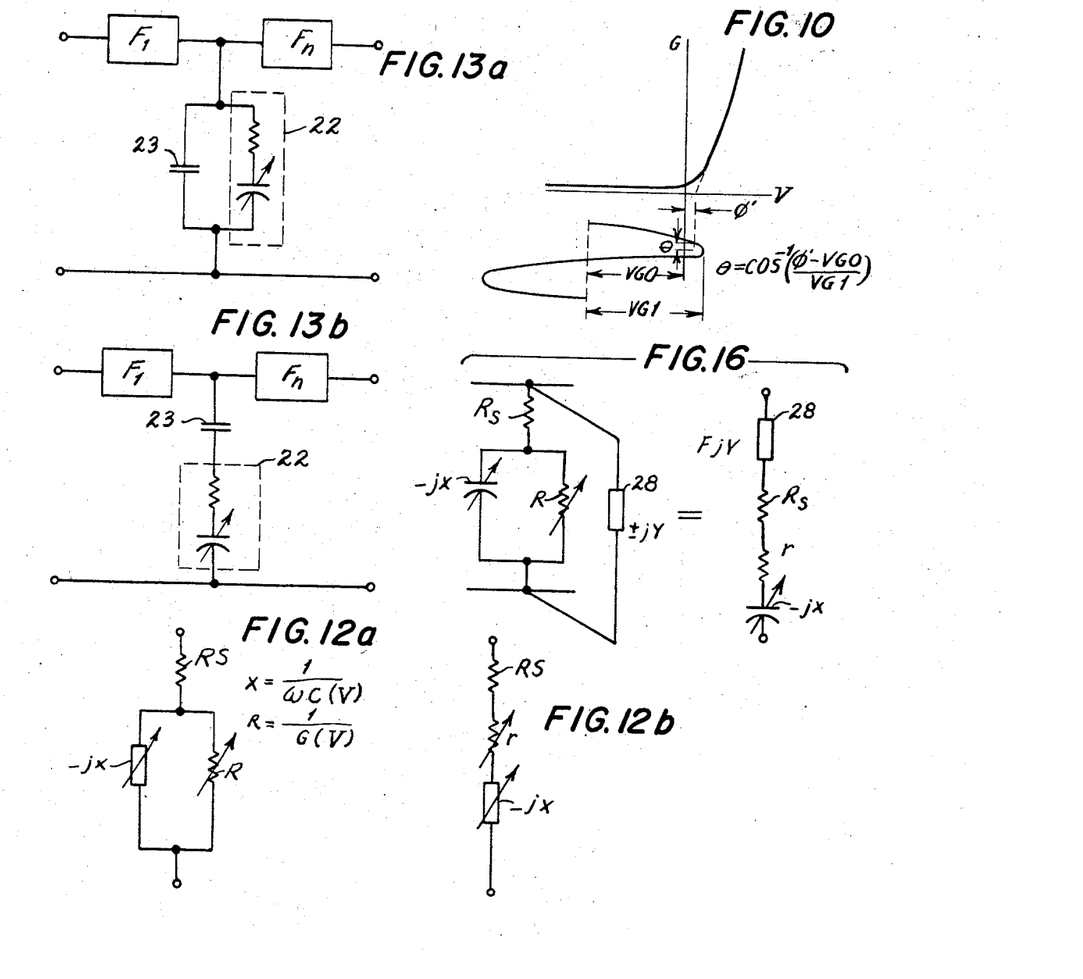

Now let us take the voltage $V_G$ as shown in FIG. 10:

$$V_G = V_{G0} + \frac{V_{G1}}{2}e^{j\left(\omega t+M\frac{\pi}{2}\right)} + \frac{V_{G1}^*}{2}e^{-j\left(\omega t+M\frac{\pi}{2}\right)}$$

where $V_{G1}=V_{G1}^*$, M is $-N$ or $1-N$ in case of parallel or in series, respectively.

The Fourier expansion in Equation 36 is then $$G = \alpha i_0 e^{\alpha V_{G0}} \sum_{n=-\infty}^{\infty} I_n[\alpha V_{G1}] e^{jn\left(\omega t + M\frac{\pi}{2}\right)} \quad (37)$$

where $I_n(\chi \cdot)$ is the modified Bessel function of 1st kind therefore $$\frac{G_0 \sigma_0}{G(V_{G0})} = I_0[\alpha V_{G1}] \quad (38)$$

Comparing with Equation 10, we see that $$\frac{\sigma_n}{\sigma_0} = \frac{I_n[\alpha V_{G1}]}{I_0[\alpha V_{G1}]} e^{jnM\frac{\pi}{2}} \quad (39)$$

From this relation we can at once find the $\sigma_n$ with the suitable delay line. The values $\sigma_{n+1}/\sigma_{n-1}$, $\sigma_{n-1}/\sigma_0$, $\sigma_2/\sigma_0$ and $\sigma_{2n}/\sigma_0$ are shown in Table 2.

TABLE 2

| | | Parallel Connection | | | | Series Connection | | | |
|---|---|---|---|---|---|---|---|---|---|
| $n$ | $N$ | $\frac{\sigma_{n+1}}{\sigma_{n-1}}$ | $\frac{\sigma_{n-1}}{\sigma_0}$ | $\frac{\sigma_2}{\sigma_0}$ | $\frac{\sigma_{2n}}{\sigma_0}$ | $N$ | $\frac{\sigma_{n+1}}{\sigma_{n-1}}$ | $\frac{\sigma_{n-1}}{\sigma_0}$ | $\frac{\sigma_2}{\sigma_0}$ | $\frac{\sigma_{2n}}{\sigma_0}$ |
| 2 | 1 | $(-)\frac{I_3}{I_1}$ | $(j)\frac{I_1}{I_0}$ | $(-)\frac{I_2}{I_0}$ | $(+)\frac{I_4}{I_0}$ | 0 | $(-)\frac{I_3}{I_1}$ | $(j)\frac{I_1}{I_0}$ | $(-)\frac{I_2}{I_0}$ | $(+)\frac{I_4}{I_0}$ |
| 3 | $\frac{1}{2}$ | $(-j)\frac{I_4}{I_2}$ | $(-j)\frac{I_2}{I_0}$ | $(-j)\frac{I_2}{I_0}$ | $(j)\frac{I_6}{I_0}$ | $\frac{1}{2}$ | $(j)\frac{I_4}{I_2}$ | $(j)\frac{I_2}{I_0}$ | $(j)\frac{I_2}{I_0}$ | $(-j)\frac{I_6}{I_0}$ |
| 4 | $\frac{1}{3}, 3$ | $\frac{1}{2}(1-j\sqrt{3})$ $(-)\frac{I_5}{I_3}$ | $(-j)\frac{I_3}{I_0}$ | $\frac{1}{2}(1-j\sqrt{3})$ $(-)\frac{I_2}{I_3}$ | $\frac{1}{2}(1-j\sqrt{3})$ $(+)\frac{I_8}{I_0}$ | $\frac{2}{3}, 2$ | $\frac{1}{2}(1+j\sqrt{3})$ $(-)\frac{I_5}{I_3}$ | $(j)\frac{I_3}{I_0}$ | $\frac{1}{2}(1+j\sqrt{3})$ $(-)\frac{I_2}{I_0}$ | $-\frac{1}{2}(1+j\sqrt{3})$ $(+)\frac{I_8}{I_0}$ |
| 5 | $\frac{1}{4}$ | $\frac{\sqrt{2}}{2}(1-j)\frac{I_6}{I_4}$ | $(-j)\frac{I_4}{I_0}$ | $\frac{\sqrt{2}}{2}(1-j)\frac{I_2}{I_0}$ | $\frac{\sqrt{2}}{2}(1-j)\frac{I_{10}}{I_0}$ | $\frac{3}{4}$ | $\frac{\sqrt{2}}{2}(1+j)\frac{I_6}{I_4}$ | $(j)\frac{I_4}{I_0}$ | $\frac{\sqrt{2}}{2}(1+j)\frac{I_2}{I_0}$ | $\frac{\sqrt{2}}{2}(1+j)\frac{I_{10}}{I_0}$ |
| 6 | 1 | $(-)\frac{I_7}{I_5}$ | $(-j)\frac{I_5}{I_0}$ | $(-)\frac{I_2}{I_0}$ | $(+)\frac{I_{12}}{I_0}$ | 0 | $(-)\frac{I_7}{I_5}$ | $(j)\frac{I_5}{I_0}$ | $(-)\frac{I_2}{I_0}$ | $(+)\frac{I_{12}}{I_0}$ |

Figure 11:
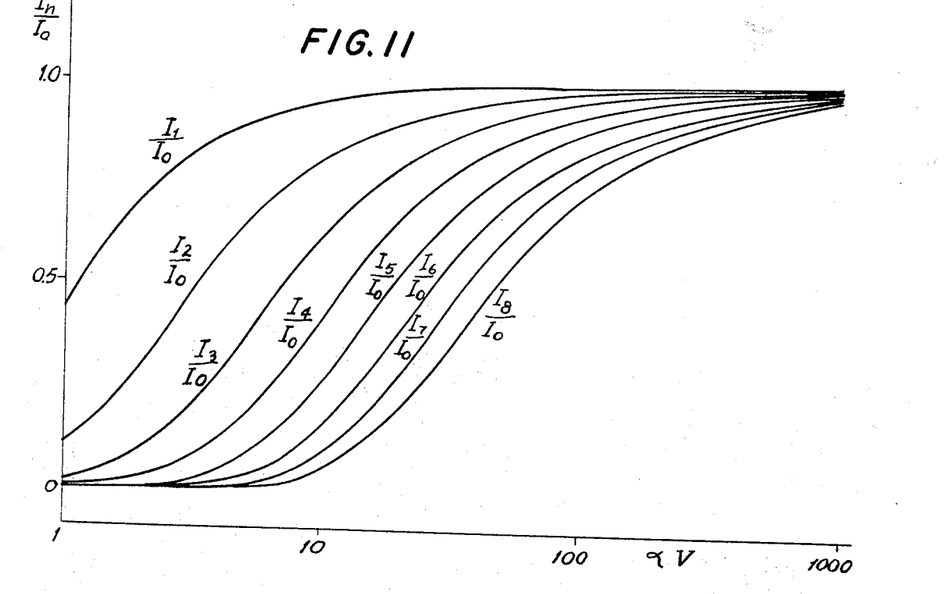

The normalized Fourier coefficients of the nonlinear conductance with an ideal exponential form are plotted in FIG. 11 as the function of $\alpha V_{G1}$.

If N is not an integer, $\sigma_p/\sigma_q$ becomes complex number and the assumption set in Equation 17 or Equation 23 which are related to the terminal conditions can no longer be satisfied. Therefore, strictly speaking, we may take only integer numbers to N. That is, we can achieve the perfect isolation only in case of even multiplications. However, in reality unidirectional condition can be held on certain cases in a close approximation even when N are not integer numbers.

The above discussion is carried out in the ideal exponential form $G = \alpha i_0 e^{\alpha V_G}$, where $V_G$ is the voltage across the barrier, but in reality there is the spreading resistance $R_s$ in the semiconductor at the contact point.

The real barrier voltage V is given by $$V = V_G - iR_s$$

where $V_G$ is the voltage applied to the rectifier, then we should correct Equation 37 and Equation 39 as $$\alpha \bar{V}_{G1}\left(1 - \frac{I_f + R_s}{\bar{V}_{G1}}\right)$$

approximately, where $I_f$ is the amplitude of fundamental component of $i$.

Another consideration (a) *Single varactor method.*—Only one varactor operating in a charge controlled doubler, sextupler and so on in which the varactor being driven into the forward conduction region can achieve the operation of unidirectional frequency multiplier.

FIGS. 12(a) and 12(b) show varcator equivalent circuits.

Generally, the equivalent circuit of varactor is expressed as in FIG. 12(a), where $$C(\bar{V}) = k(\phi - \bar{V})^{-\frac{1}{m}}, \quad G(\bar{V}) = \frac{qi_0}{KT} \exp \frac{q\bar{V}}{KT}$$

and if R is much larger than X, the transferred series resistance of the equivalent circuit, shown in FIG. 12(b), may be approximately obtained by the foregoing equations.

However, for forward biases, the charge storage by intermingling holes and electrons leads to a dominant capacitance-voltage characteristic of the form $$C\alpha \exp q\bar{V}/KT \quad (40)$$

The transferred $\gamma$ then becomes $$\gamma = \frac{x^2}{R} = \frac{(qi_0/KT) \exp (q\bar{V}/KT)}{\omega^2 K^2} (\phi - \bar{V})^{2\frac{1}{m}}$$

This is the same form as in Equation 39, therefore, the forward excitation of one varactor in a suitable time transit angle can offer the typical NR and NC, characteristics which possess the functional form obtainable unidirectional property described in the previous paragraphs and may realize the unidirectional frequency multiplier.

In this case, however, nonlinear characteristic depends upon used varactor. Therefore, when combination circuit consisting of nonlinear capacitance and nonlinear resistance is based on single varactor, the frequency multipliers described above have unidirectional property only in the restricted frequency and are not applied to all frequency.

Figure 14:
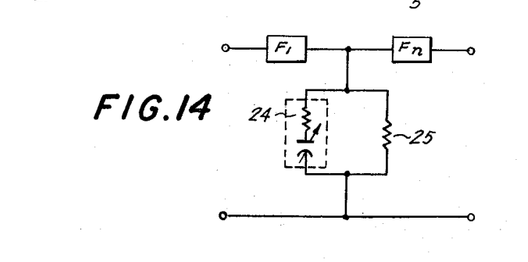

Therefore, in the other example of this invention, frequency multipliers which have unidirectional property are realized by connecting a capacitor 23 with a suitable capacitance either in series or in parallel with the varactor 22, as shown in FIGS. 13(a) and 13(b), and also by connecting a resistor 25 in parallel with the varactor 24, as shown in FIG. 14.

Figure 15A:
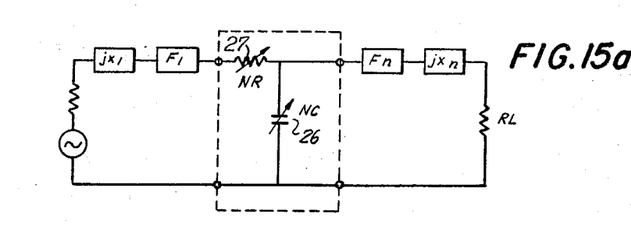
Figure 15B:
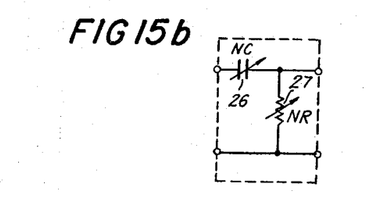
Figure 15C:
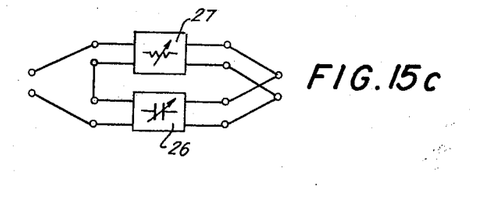

(b) *Method by nonlinear reactance element and nonlinear resistance element with no delay line.*—The reason why unidirectional frequency doubler, sextupler and so on can be realized by single varactor lie on the fact that said NC ingredient and NR ingredient are pumped by the voltages whose phases are respectively different by $\pi/2$. This permits the realization of unidirectional frequency multipliers which consist of the NC element 26 and NR element 27, as shown in FIG. 15(a), (b), (c). In the circuit shown in FIG. 15(a), the non-linear resistance 27 is inserted in the series branch and the non-linear capacitance 26 is connected to the parallel branch. In this circuit, since NR is the input side of NC, the frequency multiplication output loss due to NR is very little.

In FIG. 15(b), the non-linear capacitance 26 and the non-linear resistance 27 are mutually replaced as compared with the case of FIG. 15(a).

FIG. 15(c) shows a complex four terminal network circuit of the non-linear capacitance 26 and the non-linear resistance 27.

(c) *Utilizing idler circuit as delay line.*—Generally, higher-order frequency multipliers require additional circuits at selected harmonics of the input frequency for the realization of high conversion efficiencies. The presence of these idler circuits can be used as the delay line.

FIG. 16 shows the transferred series equivalent circuit of an idler circuit 28 which may be adjusted to function as a delay line.

The equivalent circuit of the idler in a charge controlled mode is shown in FIG. 16. If it is assumed that $$X \ll Y \text{ and } R$$

then, we obtain $$Y = \frac{X^2}{R}, \quad -y = X^2 \frac{1}{Y} \qquad (41)$$

For the storage capacitance region represented by Equation 40, the similar representation of the transferred series equivalent circuit can be also possible on the assumption that $$Y \gg X \text{ and } R$$

Therefore, if the line length of "y" which is transferred reactance "Y" as series equivalent elements is gratified as the delay line length necessary to obtain the unidirectional properties, the idler circuit can be used as the phase shifter and to circulate the current to obtain higher conversion efficiencies. However, the idler does not correspond to a matched delay line, but to a delay line with characteristic impedance $Z_0$ larger than the operating impedance of NR, so it is necessary to consider in the case accompanying the voltage amplitude variation.

Figure 17:
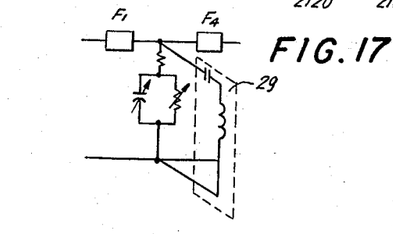

FIG. 17 shows an experimental 1–2–4 quadrupler circuit. Idler circuit 29 consists of series resonance circuit which is capacitive at fundamental frequency and inductive at quadruplex frequency. The circuit has equivalent delay length which exhibits a unidirectional characteristic. Namely, the idler circuit 29 functions as a delay line.

Experimental results

The experiment is done with a charge controlled quadrupler, having an idler circuit to operate 2nd harmonic. Input frequency $\omega_0$ is 540 mc. and output frequency is 2160 mc.

The capacitance at operating point of the varactor is about 6 pf. Said idler circuit is constructed as shown in FIG. 17 to show the capacitive reactance at input frequency, tuned at $2\omega_0$ and the inductive reactance at the output frequency as the equivalent delay line.

Figure 18:
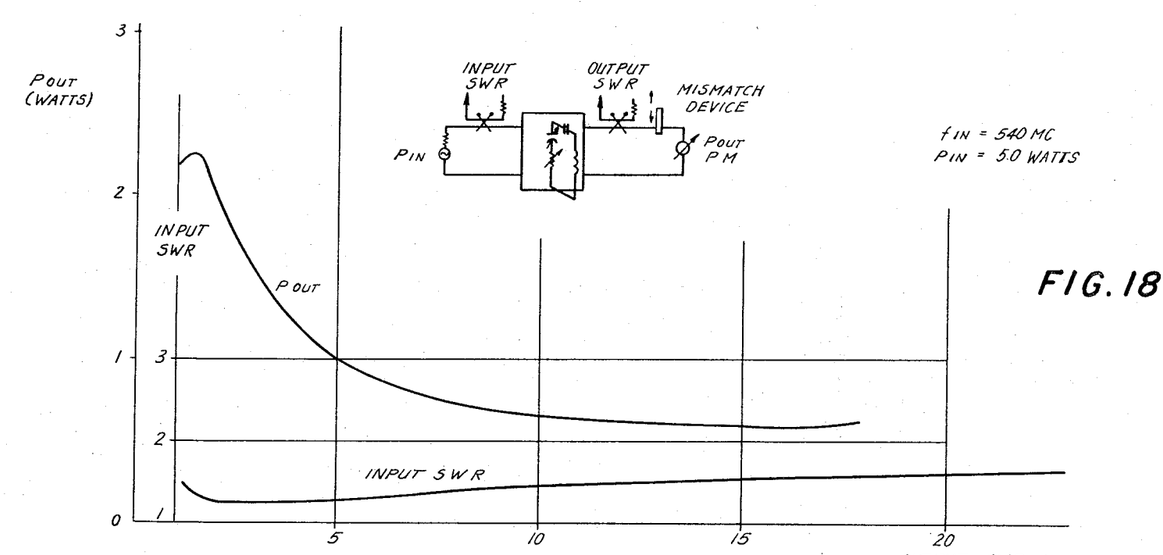

FIG. 18 shows the input SWR (Standing Wave Ratio) and output power characteristics when output circuit is adjusted to mis-match condition. Input SWR that holds nearly constant matched condition, namely the excellent unidirectional property is obtained.

Figure 19:
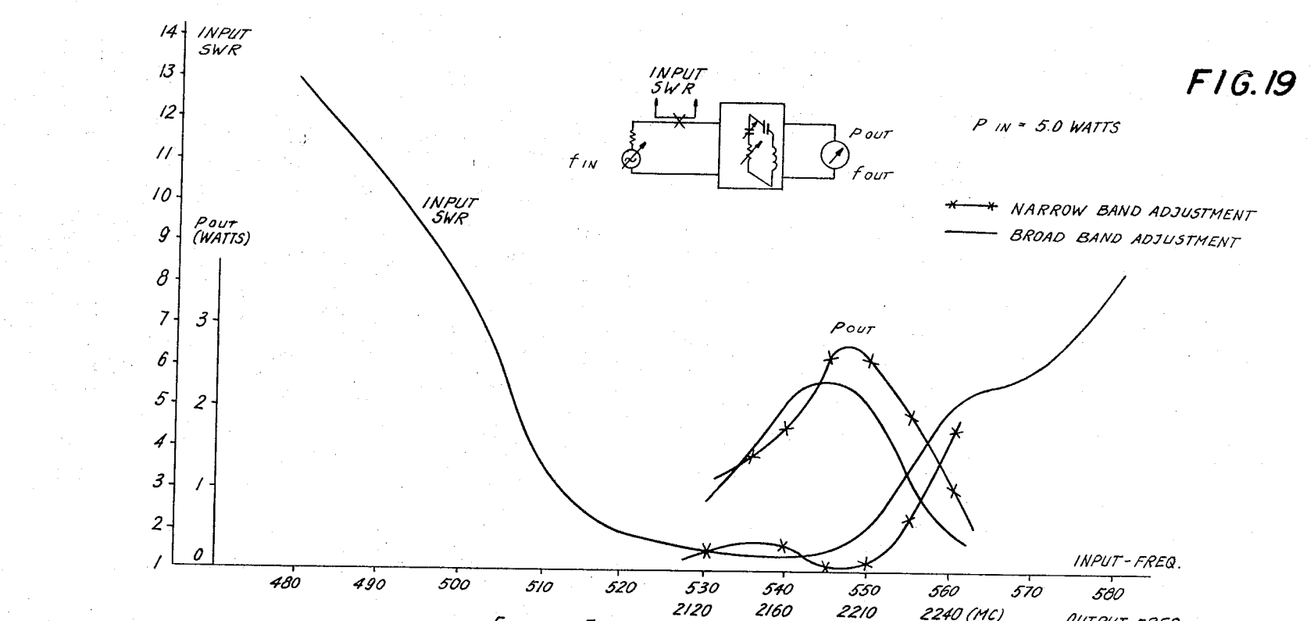

FIG. 19 shows the frequency characteristic of input SWR and output power. From these results we can obtain the Q value of about 22. Theoretical calculation of Q is about 30 (where we assumed the over voltage transit angle to be 15°). This difference is due to losses contributable to the input idler and output circuits.

Figure 20:
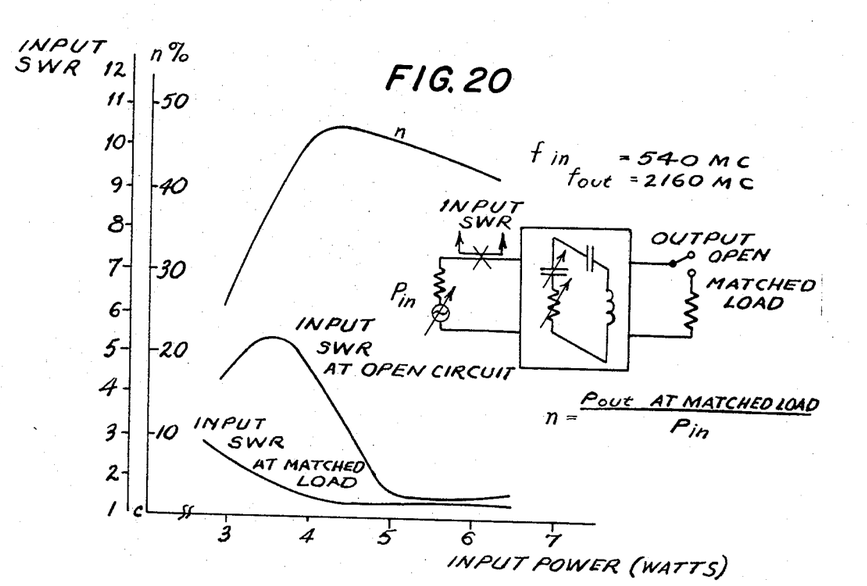
Figure 21:
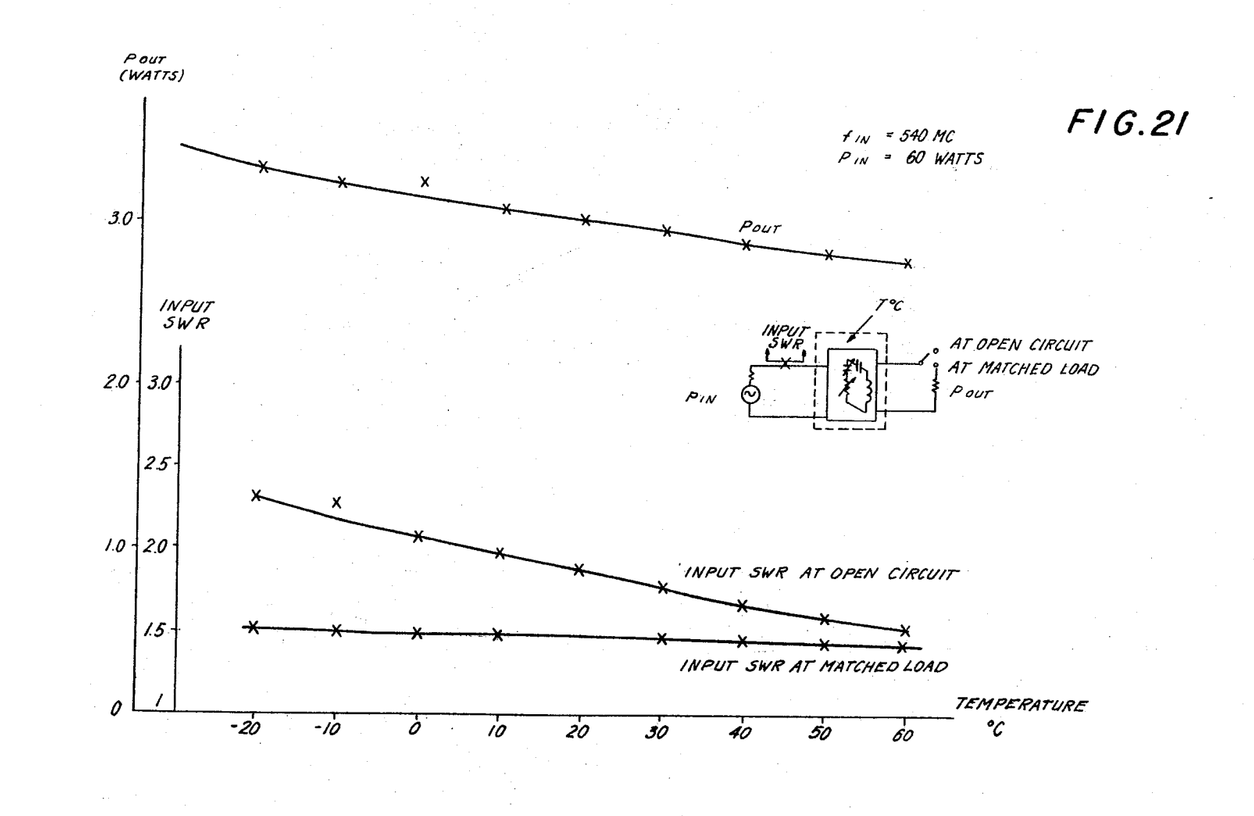

FIG. 20 shows input signal level versus conversion efficiency and input SWR when output is matched or open FIG. 21 shows the temperature characteristic of output power and isolation property, that is, input SWR when output is matched or open are shown, the difference betwene two in this case, is very small in high temperature.

CONCLUSION

It has been shown that both the parallel NC–NR and the series NC–NR frequency multiplier circuits, pumped by the suitable voltage amplitude and proper time phase, are capable of yielding non-reciprocal features with conversion efficiency exceeding the common varactor multiplier circuit which has the same Q value determined from the unidirectional condition, especially for even harmonic multipliers, the condition can be strictly satisfactory in the speculative theory.

For the conversion efficiencies of unidirectional frequency multiplier, series connection in the doubler is better than that of parallel connection, but in the higher harmonic multipliers, it has a tendency to reverse, namely, parallel connection has larger efficiency than that of series connection.

The simplest unidirectional frequency multiplier can be achieved by only one varactor which operates in charge controlled mode and is overdriven to give adequate nonlinear resistance in case of doubler and sextupler and so on.

Other harmonic generators utilizing the idler circuit may comprise a simple non-reciprocal frequency multipliers without inserting the delay line.

Experimental result shows good agreement with the theory.

We claim:
1. A unidirectional frequency multiplier, comprising a pair of input terminals for supplying an input signal;
a pair of output terminals for providing an output signal;
a non-linear reactance;
a non-linear resistance connected to said non-linear reactance, said reactance and resistance being connected between said input and output terminals; and
a delay line connected in series with one of said reactance and resistance and having an equivalent electrical length dependent upon the degree of multiplication.

2. A unidirectional frequency multiplier as claimed in claim 1, wherein said non-linear reactance comprises a non-linear capacitance and said non-linear resistance is connected in parallel with said non-linear reactance.

3. A unidirectional frequency multiplier as claimed in claim 1, wherein said non-linear reactance comprises a non-linear capacitance and said non-linear resistance is connected in series with said non-linear reactance.

4. A unidirectional frequency multiplier as claimed in claim 1, wherein said non-linear resistance is connected in parallel with said non-linear reactance and said delay line has an equivalent electrical length of $N\pi/2$ which is equal to $$\frac{(4a+3)\frac{\pi}{2}}{(1-n)}$$

wherein $n$ is the degree of multiplication and $a$ is a constant.

5. A unidirectional frequency doubler as claimed in claim 1, wherein said non-linear resistance is connected in series with said non-linear reactance and said delay line, and said delay line has an equivalent electrical length of $N\pi/2$ which is equal to $$\frac{\pi}{2} - \frac{(4a+1)\frac{\pi}{2}}{(n-1)}$$

wherein $n$ is the degree of multiplication and $a$ is a constant.

6. A unidirectional frequency multiplier as claimed in claim 1, wherein said delay line is connected in parallel with said reactance and resistance and comprises a series resonant idler circuit which corresponds to the difference in frequency between said input signal and said output signal, said difference being said degree of multiplication.

7. A unidirectional frequency multiplier as claimed in claim 1, wherein said non-linear reactance comprises a varactor and said non-linear resistance permits a current flow in the forward direction of said varactor when said varactor is biased.

8. A unidirectional frequency multiplier as claimed in claim 7, further comprising one of a capacitor and a resistor connected in parallel with said varactor and a capacitor connected in series with said varactor.

9. A unidirectional frequency multiplier as claimed in claim 7, further comprising one of a capacitor and a resistor connected in parallel with said varactor.

10. A unidirectional frequency multiplier as claimed in claim 7, further comprising a capacitor connected in series with said varactor.

References Cited

UNITED STATES PATENTS

| | | | |
|---|---|---|---|
| 2,152,016 | 3/1939 | Baesecke et al. | 321—69 X |
| 2,443,094 | 6/1948 | Carlson et al. | 321—69 |
| 3,008,081 | 11/1961 | Duinker | 321—69 |
| 3,163,781 | 12/1964 | Barringer | 321—69 |
| 3,262,058 | 7/1966 | Ballman et al. | 321—69 X |
| 3,229,229 | 1/1966 | Tozzi | 307—88.5 X |
| 3,333,180 | 7/1967 | Neu | 321—69 |

JOHN F. COUCH, *Primary Examiner.*

G. GOLDBERG, *Assistant Examiner.*